United States Patent

[11] 3,599,720

| [72] | Inventor | Pierre Mathern<br>Paris, France |
|------|----------|---------------------------------|
| [21] | Appl. No. | 838,224 |
| [22] | Filed | July 1, 1969 |
| [45] | Patented | Aug. 17, 1971 |
| [73] | Assignee | Samuel Lahmani<br>Paris, France |
| [32] | Priority | July 5, 1968 |
| [33] |          | France |
| [31] |          | PV 158,195 |

[54] ADJUSTABLE SIZE HORSESHOE
8 Claims, 9 Drawing Figs.

[52] U.S. Cl. .................................................. 168/4,
168/12
[51] Int. Cl. ........................................ A01l 01/00,
A01l 03/00
[50] Field of Search ......................................... 168/4, 9, 12

[56] References Cited
UNITED STATES PATENTS

| 726,643 | 4/1903 | Colleran .................... | 168/4 |
| 1,946,636 | 2/1934 | Nygaard ..................... | 168/4 |
| 3,050,133 | 8/1962 | Ketner et al. ............... | 168/4 |
| 3,302,723 | 2/1967 | Renkenberger et al. ..... | 168/4 |
| 3,469,631 | 9/1969 | Becker ........................ | 168/4 |
| 3,470,960 | 10/1969 | Masone ....................... | 168/4 |
| 3,490,536 | 1/1970 | Hourlier ...................... | 168/4 |
| 3,494,422 | 2/1970 | Clark ........................... | 168/4 |

FOREIGN PATENTS

| 358,446 | 1931 | Great Britain ............... | 168/12 |

*Primary Examiner*—Aldrich F. Medbery
*Attorney*—Young & Thompson

ABSTRACT: A horseshoe has a rear transverse portion made of at least two superimposed parts of a material that can be cut off for width adjustment of the shoe and then secured in superimposed relation for providing a unitary plate bridging the rear ends of the side limbs of the horseshoe when adjustment of the shoe width has been made.

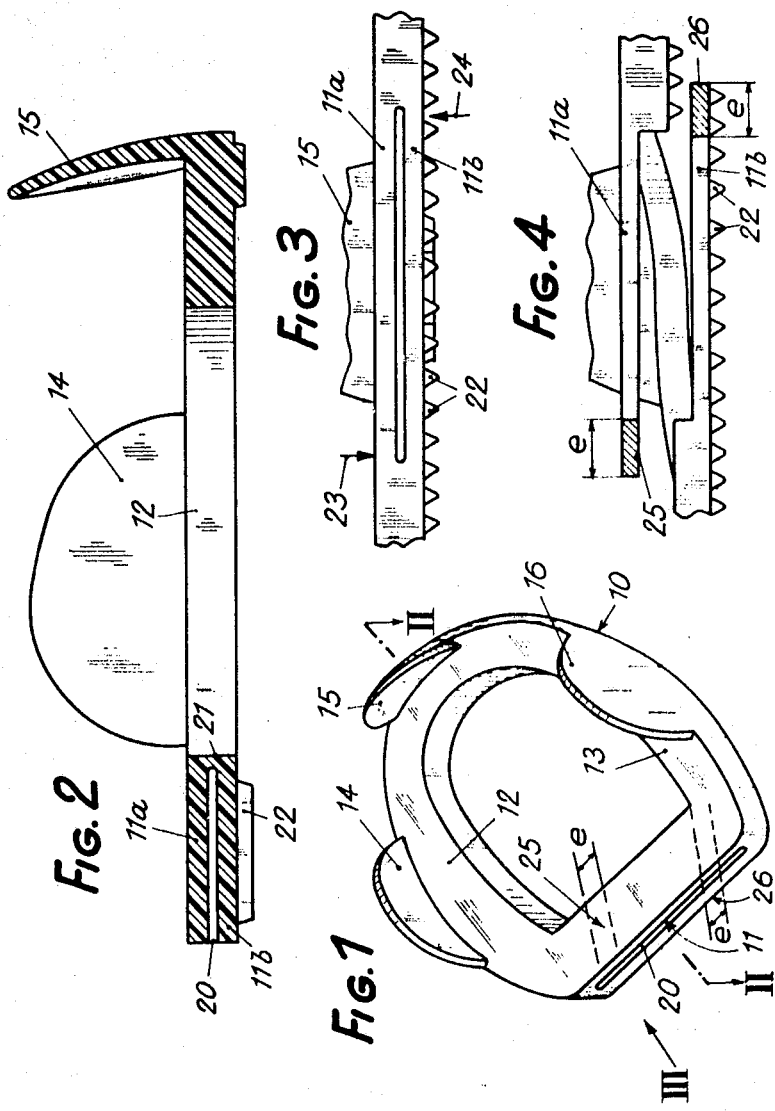

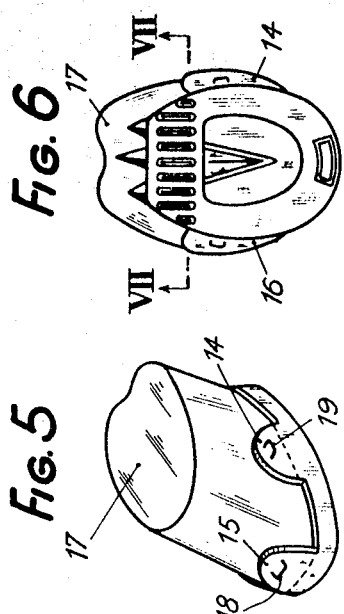
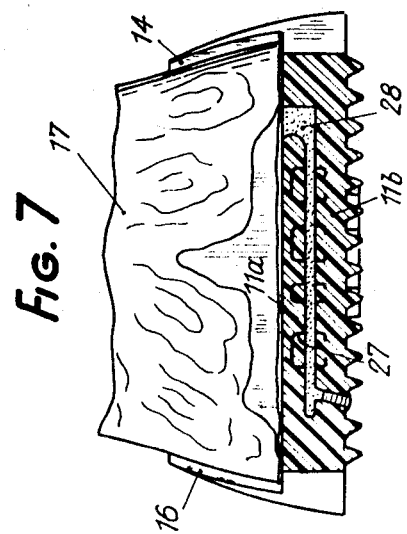
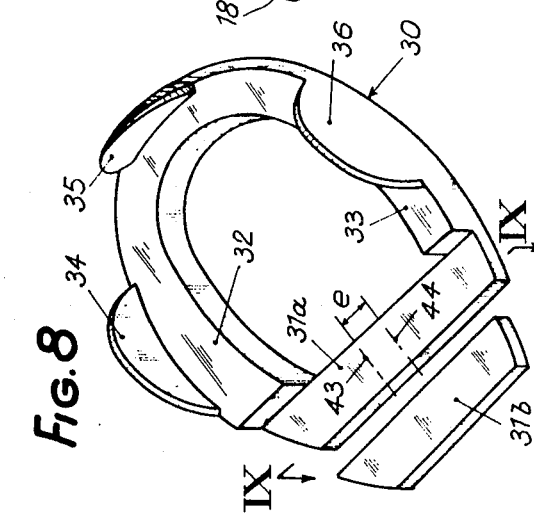

ADJUSTABLE SIZE HORSESHOE

The present invention relates generally to shoes for the feet of animals and relates more particularly to horseshoes for the hoofs of horses or other solidungulate animals of the equine family.

It is known that in order to shoe a horse, there is applied against the lower face of the hoof a shoe or plate made of a suitable metal such as steel or aluminum having spaced holes through which nails are engaged and driven into the peripheral horny portion of the ungula. This is a rather delicate operation which requires skilled shoeing smiths particularly for shoeing racehorses which may be dangerously and irrevocably crippled if the shoeing operation is not done properly and with enough care.

An object of the invention is to provide a new or improved shoe for an animal, particularly a horseshoe facilitating the shoeing operation and avoiding the disadvantages defined hereinbefore.

Another object of the invention is to provide a new or improved shoe for an animal, particularly a horseshoe of reduced weight giving better running or racing qualities to animals, particularly horses such as racehorses shod with such improved shoes.

A further object of the invention is to provide a new or improved shoe for an animal, particularly a horseshoe enabling the foot or hoof of the animal to be shod with the greatest accuracy as though the shoe had been made as it were to measure.

A still further object of the invention is to provide an improved method for applying and securing said new shoe to the foot or hoof of an animal, particularly a horse having to be shod by this improved method.

With these and such other objects in view as will incidentally appear hereafter, the invention comprises among other features the novel construction and combination of parts for a horseshoe or the like as will be more particularly described hereafter with reference to the accompanying drawing exemplifying the same and forming a part of the present disclosure.

In the drawing:

FIG. 1 is a perspective view of a molded horseshoe according to a first constructional form of the invention.

FIG. 2 is a sectional view on the line II–II of FIG. 1 but drawn to a larger scale.

FIG. 3 is a rear view of the horseshoe looking in the direction indicated by the arrow III.

FIG. 4 is a view similar to FIG. 3 showing the cutting operation effected on the rear element of the horseshoe so as to adapt it to the size of the animal foot or hoof.

FIG. 5 is a perspective view showing the appearance of the animal foot or hoof shod with the improved shoe, assuming the same to be viewed towards the front end.

FIG. 6 is a bottom plan view of the thus shod foot or hoof,

FIG. 7 is a sectional view on the line VII–VII of FIG. 6 drawn to a larger scale and partly broken away.

FIG. 8 is a view similar to FIG. 1 showing a constructional modification.

FIG. 9 is a sectional view on the line IX–IX of FIG. 8 showing the shape of the horseshoe before it is to be applied to the animal foot or hoof.

Reference being first had to FIGS. 1 to 7, the horseshoe according to the invention has the usual or conventional shape of a horseshoe comprising a rear cross plate 11 bridging or interconnecting the two side limbs 12 and 13 of the body portion of the shoe.

Three upstanding lugs 14,15,16 are formed integral with the body portion of the shoe at its front end and on its sides respectively. As shown in FIGS. 5 to 7, the lugs 14,15,16 are adaptable to a part of the upper portion of the hoof 17 and may be held in position or stuck by a suitable glue against said hoof by applying the method as described hereinafter.

In the illustrated example, it has been assumed that the horseshoe is constituted by a suitable plastic of the polyamide family such as nylon. Under this assumption, in order to facilitate the sticking of the lugs 14,15,16 against the confronted faces of the hoof, the lugs may be pinned or clinched to the hoof as shown at 18 and 19.

The rear plate 11 the purpose of which is to strengthen the horseshoe is molded simultaneously with its body portion. Said plate 11 is made up of two parts 11a and 11b which are separated by a slot 20 that is advantageously closed at 21 on the inner side of said plate. The parts 11a, 11b thus have a thickness which is substantially equal to half the one of the shoe limbs. Notches or flutes 22 are provided on the lower face of the shoe particularly of the plate 11 for providing a nonskid surface.

When the horseshoe is applied into position, where it is found that it is unduly wide for the hoof to be shod so that the lugs 14,15,16 would not be properly applied to the hoof, the following method is advantageously used:

The two parts 11a, 11b of the plate 11 are cut on the line of the arrows 23, 24 (see FIG. 3). The bottom 21 of the slot 20 is also cut, whereafter as shown in FIG. 4, the two parts 11a, 11b of the plate are spread apart or slid sidewise so as to tighten the rear portion of the horseshoe by bringing nearer together the rear edges of the limbs 12, 13. When the correct rear width has been given to the horseshoe properly to fit the hoof, the two surplus hatched strips 25, 26 (see FIG. 4) are cut off. Assuming e to designate the width of said strips, the horseshoe is narrowed by e in its rear portion.

Following this operation and as shown in FIG. 7, the two shortened portions 11a, 11b of the plate 11 are interconnected, for example by clasps 27 and a layer of glue 28. The horseshoe is thus adapted to the hoof which becomes perfectly shod.

The last operation to be performed is to apply the horseshoe to the hoof by means of an adhesive which is particularly applied against the inner face of the clamping lugs 14,15,16.

In the foregoing example, it has been assumed that the horseshoe is made of a plastic but it is obvious that it may be made of any suitable metal or alloy such as the one often known as "zamak."

However, it is obvious that due to the fact that the horseshoe is not nailed to the hoof but is glued to it, the horseshoe may be made much thinner than in the prior art. A thickness of the order of 2 millimeters is suitable and provides a horseshoe which is both very economical and light in weight.

Reference being now had to FIGS. 8 and 9 which show a constructional modification, the parts are designated by similar references but increased by 20. Only the lower part 31b of the rear plate of the horseshoe is cast integral with the remainder of the horseshoe 30 whereas the part 31b of the plate is molded separately.

Where the horseshoe exactly fits the hoof, it may be directly applied and stuck to it by a suitable glue. Where, however, the horseshoe is unusually large, the part 31a of its rear plate is cut along the lines 43, 44, thus reducing by e the length of the plate 31a and consequently the width of the rear portion. The length of the part 31b is correspondingly reduced as shown in FIG. 9 and the parts 31a, 31b are clasped and stuck so as to impart to the horseshoe the appropriate size. Once thus prepared, the horseshoe may be readily used as in FIG. 7.

Minor constructional details may be varied without departing from the ambit of the invention. Thus, the invention involves horseshoes or like animal shoes having no rear or cross plate where the body portion has a sufficient stiffness for taking the strains to which it is subjected, for example if it is made of a strong or robust metal or alloy such as steel. Likewise the number and shape of the clamping lugs may be modified. Providing three lugs as shown is advantageous but this number is not limitative. For example four symmetrically located clamping lugs may be provided, namely two lugs at the front end and two lugs at the rear end of the horseshoe.

What I claim is:

1. A shoe adaptable to the hoof or foot of an animal and particularly a horseshoe comprising a body portion having side limbs with free rear ends, upstanding lugs projecting from said body portion and adapted to be clamped against the animal hoof and a rear transverse portion extending between said rear ends of said side limbs of the body portion, wherein said rear transverse portion is made of at least two superimposed parts, at least one of said parts being a portion of a said side limb of said body portion, said parts being made of a material which can be easily varied in length for width adjustment of the shoe, and being securable together in a superimposed relation defining a unitary portion bridging said rear ends of said side limbs when adjustment of the shoe width has been made.

2. A shoe according to claim 1, made of plastics and secured to said hoof by means of an adhesive, wherein said cutoff parts of the rear portion are arranged to be adhesively secured in a superimposed relation for providing a unitary portion bridging said rear ends of said side limbs when adjustment of the shoe width has been made.

3. A shoe adaptable to the hoof or foot of an animal and particularly a horseshoe comprising a body portion having side limbs with rear free ends, upstanding lugs projecting from said body portion and adapted to be clamped against the animal hoof and a rear transverse portion extending between said rear ends of said side limbs of the body portion, wherein said rear plate is made of two superimposed parts unitary with the rear ends of said side limbs, said parts being separated by a horizontal slot, so that each of said parts can be cut off for width adjustment of the shoe and secured in a superimposed relation for defining a unitary portion bridging said rear ends of said side limbs when adjustment of the shoe width has been made.

4. A shoe according to claim 3, wherein said slot is closed on the side of said rear portion directed towards said body portion of the shoe.

5. A shoe according to claim 3, wherein said cutoff parts of said rear portion can be adhesively secured in a superimposed relation when adjustment of the shoe width has been made.

6. A shoe adaptable to the hoof or foot of an animal and particularly a horseshoe comprising a body portion having side limbs with free ends, upstanding lugs projecting from said body portion and adapted to be clamped against the animal hoof and a rear transverse portion extending between said rear ends of said side limbs of the body portion, wherein said rear portion comprises a first part unitary at both ends with said rear ends of said limbs, said first part being made of a material which can be cut off for width adjustment of the shoe, and a second part superimposable to the first part and arranged to be secured to said first cutoff part in a superimposed relation with respect thereto when the width adjustment of the shoe has been made, so as to provide a unitary portion bridging said rear ends of said side limbs.

7. A method of applying and fixing a horseshoe to the hoof of an animal, said horseshoe having a rear transverse portion made of two vertically superimposed parts, bridging and interconnecting the limbs of its body portion, comprising the steps of cutting off portions of said superimposed parts of the rear plate for shortening the same, transversely shifting said shortened parts until they substantially completely overlie each other, bringing them in a vertically superimposed relation, and integrally joining said shortened and shifted parts by adhesive to form a unitary portion spanning the links and giving the shoe the exact width of the hoof.

8. A method according to claim 7, wherein said parts are secured together by adhesive and clasps.